(12) United States Patent
Lakshmireddy

(10) Patent No.: US 10,444,907 B2
(45) Date of Patent: Oct. 15, 2019

(54) DEVICES AND METHODS FOR USING AN INFRARED-PROJECTED CAPACITIVE (IR-PCAP) TOUCHSCREEN

(71) Applicant: HONEYWELL INTERNATIONAL INC., Morris Plains, NJ (US)

(72) Inventor: Karthik Lakshmireddy, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 175 days.

(21) Appl. No.: 15/596,774

(22) Filed: May 16, 2017

(65) Prior Publication Data
US 2018/0335892 A1 Nov. 22, 2018

(51) Int. Cl.
G06F 3/042 (2006.01)
G06F 3/044 (2006.01)
G06F 3/041 (2006.01)

(52) U.S. Cl.
CPC ............ *G06F 3/0421* (2013.01); *G06F 3/044* (2013.01); *G06F 3/0416* (2013.01); *G06F 2203/04106* (2013.01)

(58) Field of Classification Search
None
See application file for complete search history.

(56) References Cited

U.S. PATENT DOCUMENTS

| 5,231,381 | A | * | 7/1993 | Duwaer | ................ | G06F 3/016 |
|---|---|---|---|---|---|---|
| | | | | | | 178/18.03 |
| 6,492,979 | B1 | | 12/2002 | Kent et al. | | |
| 2006/0097991 | A1 | | 5/2006 | Hotelling et al. | | |
| 2007/0165008 | A1 | | 7/2007 | Crockett | | |
| 2008/0117176 | A1 | | 5/2008 | Ko et al. | | |
| 2009/0091551 | A1 | | 4/2009 | Hotelling et al. | | |
| 2010/0182270 | A1 | | 7/2010 | Caliskan et al. | | |
| 2011/0141055 | A1 | | 6/2011 | Hsu | | |
| 2013/0002994 | A1 | | 1/2013 | Wang et al. | | |

OTHER PUBLICATIONS

"Touchscreen", Wikipedia, 5/16/1, https://en.wikipedia.org/wiki/Touchscreen.

(Continued)

*Primary Examiner* — Brian M Butcher
(74) *Attorney, Agent, or Firm* — Lorenz & Kopf, LLP

(57) ABSTRACT

A method for operating a touchscreen device is provided. The method identifies a status of the touchscreen device, by at least one processor, wherein the touchscreen device comprises at least a projected capacitive (PCAP) touchscreen mounted in front of a liquid crystal display (LCD) of the touchscreen device, an infrared (IR) touch sensor configured to generate an IR grid, a switch, and the at least one processor, and wherein the status comprises one of a default state lacking user touch input and a touch-state receiving active user touch input. When the status comprises the touch-state, the method adjusts the switch to enable user input selections via the PCAP touchscreen. When the status comprises the default state, the method retains a position of the switch, the position configured to disable user input selections via the PCAP touchscreen.

20 Claims, 11 Drawing Sheets

(56) References Cited

OTHER PUBLICATIONS

"Comparing the Top 5 Touch Screen Technologies," AbraxSys Rugged & Sunlight Readable LCD Systems Blog, dated May 31, 2015, http://abraxsyscorp.com/blog/comparing-the-top-5-touch-screen-technologies/.

"NLT PCAP Touch Panel," NLT Technologies, 2014, https://www.eltech.spb.ru/ckfinder/userfiles/files/%D0%9F%D1%80%D0%B5%D0%B7%D0%B5%D0%BD%D1%82%D0%B0%D1%86%D0%B8%D1%8F%20%D0%BF%D0%BE%20PCAP%20NLT%20Technologies.pdf.

Microchip, "AD-120007-001 FAQs—Sensor Design Guidelines," 2012, http://ww1.microchip.com/downloads/en/DeviceDoc/FAQs%20-%20Sensor%20Design%20Guidelines.pdf.

Camacho, Oscar and Eduardo Viramontes, "Designing Touch Sensing Electrodes Electrical Considerations and Recommended Layout Patterns," Freescale Semiconductor Document AN3863, Rev. 4, Jul. 2011, https://cache.freescale.com/files/sensors/doc/app_note/AN3863.pdf.

Barrett, Gary L. "Choose the Right Touch Technology for Your Display," Medical Electronics Design, Apr. 25, 2012, http://www.medicalelectronicsdesign.com/article/choose-right-touch-technology-your-display.

Barrett, Gary and Ryomei Omote, "Projected-Capacitive Touch Technology," Information Display, Mar. 2010, http://large.stanford.edu/courses/2012/ph250/lee2/docs/art6.pdf .

3M Touch Systems, "Touch Technology Brief Projected Capacitive Technology," 2013, http://multimedia.3m.com/mws/media/788463O/tech-brief-projected-capacitive-technology.pdf.

Tru-Vu, "The 5 Types of Touch Screen Technology. Which One Is Best for You?", http://www.tru-vumonitors.com/Images/Touch_Screen_Basics.Comparisons.pdf.

Analog Devices, ADG888 Data Sheet, Rev. C, © 2005-2017, http://www.analog.com/media/en/technical-documentation/data-sheets/ADG888.pdf.

T, Anthony, "Finger-Friendly Design: Ideal Mobile Touchscreen Target Sizes," Smashing Magazine, Feb. 21, 2012, https://www.smashingmagazine.com/2012/02/finger-friendly-design-ideal-mobile-touchscreen-target-sizes/.

"Bee in Flybe Cockpit Forces Flight to Dublin to Return," Jun. 8, 2015, http://www.irishtimes.com/business/transport-and-tourism/bee-in-flybe-cockpit-forces-flight-to-dublin-to-return-1.2241446.

"iPhone 5 Touch Screen Twice as Fast as Android Touch Screen—Mac Rumors," Sep. 21, 2013, https://www.macrumors.com/2013/09/21/iphone-5-touch-screen-twice-as-fast-as-android-touch-screen/.

"How to Build an IR Sensor," Aug. 2013, http://maxembedded.com/2013/08/how-to-build-an-ir-sensor/.

Liu, Joshua, "What Materials Reflect Infrared?" https://www.techwalla.com/articles/what-materials-reflect-infrared.

* cited by examiner

DEVICES AND METHODS FOR USING AN INFRARED-PROJECTED CAPACITIVE (IR-PCAP) TOUCHSCREEN

TECHNICAL FIELD

Embodiments of the subject matter described herein relate generally to touchscreen devices and, more particularly, embodiments of the subject matter relate to using a combination of infrared sensors and projected capacitive touch technology in a touchscreen device.

BACKGROUND

A touchscreen is an input device normally positioned over, and coupled to, an electronic display of a computing device or an information processing system. A user can provide input or control the information processing system through simple or multi-touch gestures by touching the screen with a special stylus and/or one or more fingers. The touchscreen enables the user to interact directly with displayed text and graphical elements, rather than using a mouse, touchpad, or any other intermediate device. Touchscreens are common in devices such as game consoles, personal computers, tablet computers, electronic voting machines, and smartphones.

A standard touchscreen may implement projected capacitive (PCAP) touch technology. However, PCAP touch technology may be sensitive to signal interference, such as electromagnetic interference (EMI), radio frequency interference (RFI), or the like. Accordingly, it is desirable to provide touchscreen features that accommodate signal interference. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for operating a touchscreen device. The method identifies a status of the touchscreen device, by at least one processor, wherein the touchscreen device comprises at least a projected capacitive (PCAP) touchscreen mounted in front of a liquid crystal display (LCD) of the touchscreen device, an infrared (IR) touch sensor configured to generate an IR grid, a switch, and the at least one processor, and wherein the status comprises one of a default state lacking user touch input and a touch-state receiving active user touch input. When the status comprises the touch-state, the method adjusts the switch to enable user input selections via the PCAP touchscreen. When the status comprises the default state, the method retains a position of the switch, the position configured to disable user input selections via the PCAP touchscreen.

Some embodiments of the present disclosure provide a touchscreen device, which includes a projected capacitive touch (PCAP) touchscreen mounted in front of a liquid crystal display (LCD); a switch coupled to the PCAP touchscreen, the switch configured to shift between a first position connecting the PCAP touchscreen to ground and a second position connecting the PCAP touchscreen to a touch-controller; an infrared (IR) touch sensor configured to generate an IR grid; and the touch-controller comprising at least a system memory element and a processor, the touch-controller communicatively coupled to the PCAP touchscreen, the switch, and the IR sensor, and the touch-controller configured to: identify a status of the touchscreen device, wherein the status comprises one of a default state lacking user touch input and a touch-state receiving active user touch input; when the status comprises the touch-state, adjust the switch to enable user input selections via the PCAP touchscreen, based on adjusting the switch; and when the status comprises the default state, retain a position of the switch, the position configured to disable user input selections via the PCAP touchscreen.

Some embodiments of the present disclosure provide a touchscreen system, which includes a projected capacitive touch (PCAP) touchscreen mounted in front of a liquid crystal display (LCD); a switch coupled to the PCAP touchscreen, the switch configured to shift between a first position connecting the PCAP touchscreen to ground and a second position connecting the PCAP touchscreen to a touch-controller; an infrared (IR) touch sensor mounted in a bezel of the LCD and positioned in front of the LCD, wherein the IR touch sensor further comprises an infrared (IR) receiver, an infrared (IR) light emitting diode (LED), and infrared (IR) reflectors positioned on opposite sides of the LCD, wherein the IR LED and the IR receiver are aligned in the bezel to produce multiple close reflections between the IR reflectors to generate an IR grid capable of sensing an object approaching the PCAP touchscreen during touch operation; and the touch-controller comprising at least a system memory element and a processor, the touch-controller communicatively coupled to the PCAP touchscreen, the switch, and the IR sensor, and the touch-controller configured to: identify a status of the touchscreen device, wherein the status comprises one of a default state lacking user touch input and a touch-state receiving active user touch input; when the status comprises the touch-state, adjust the switch to enable user input selections via the PCAP touchscreen, based on adjusting the switch; and when the status comprises the default state, retain a position of the switch, the position configured to disable user input selections via the PCAP touchscreen.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to devices and methods for using infrared projected capacitive (IR-PCAP) technology for a touchscreen. An infrared projected capacitive (IR-PCAP) touchscreen is a touchscreen that implements infrared (IR) touch sensors in combination with a projected capacitive (PCAP) touchscreen. Certain terminologies are used with regard to the various embodiments of the present disclosure. A touchscreen status is a current condition associated with user interaction with the touchscreen device. The status may be a touch-state or a default state. The touch-state occurs when a user is actively interacting with the PCAP touchscreen and/or when the touchscreen device detects potential user interaction and prepares for the potential user interaction by enabling user input to the PCAP touchscreen. The default state is characterized by a lack of user interaction, or detected potential user interaction, with the touchscreen device. User-selected touch coordinates reference an x-axis position and a y-axis position of the PCAP touchscreen, which is the contact location of user touch.

Figure 1:
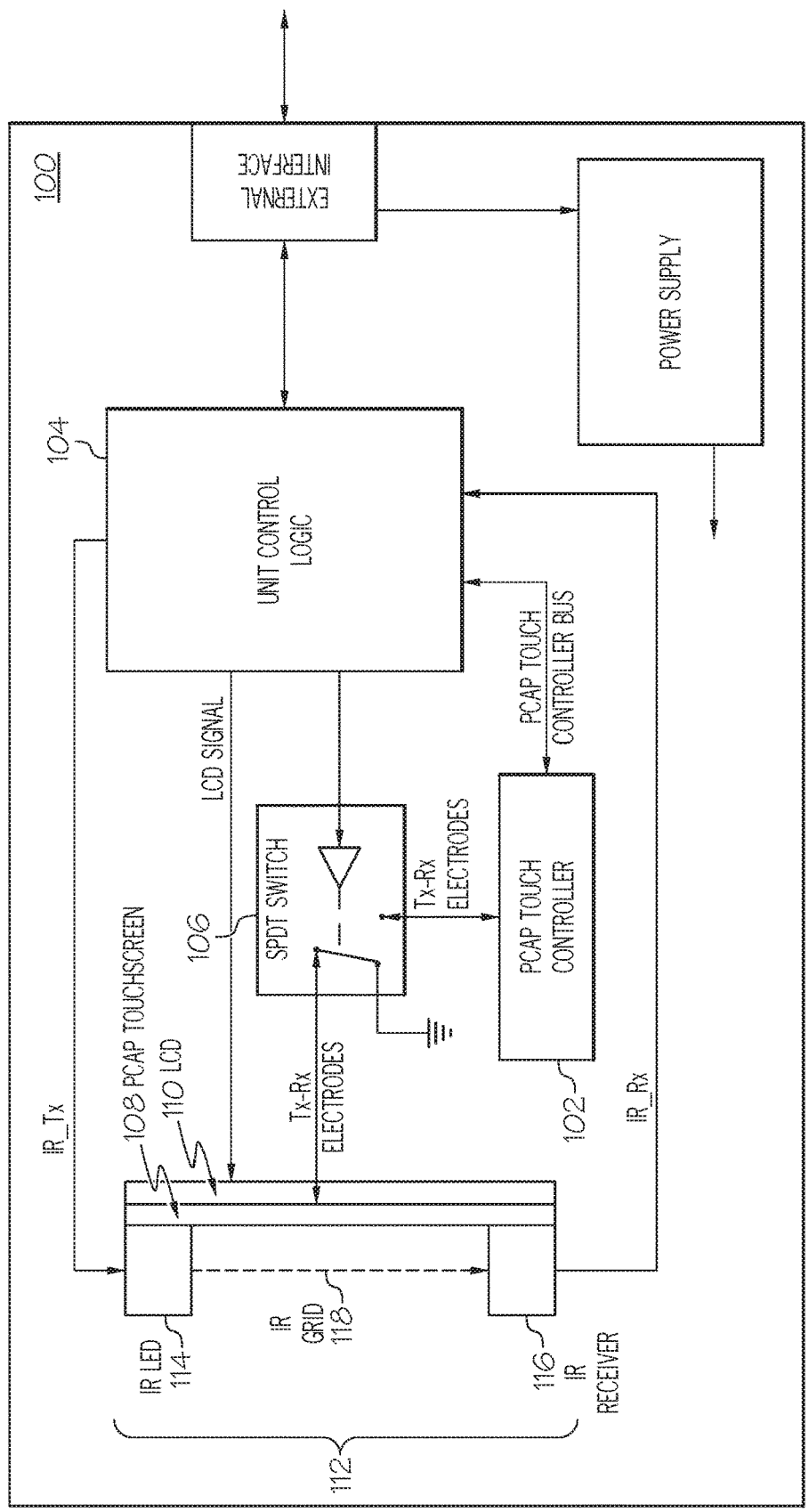
FIG. 1 is a functional block diagram of a touchscreen device, in accordance with the disclosed embodiments.

Turning now to the figures, FIG. 1 is a functional block diagram of a touchscreen device 100, in accordance with the disclosed embodiments. The touchscreen device 100 implements infrared (IR) touch sensor technology in combination with projected capacitive (PCAP) touchscreen technology, to accommodate sensitivities of PCAP technology to electromagnetic interference (EMI) and radio frequency interference (RFI). The touchscreen device 100 may include, without limitation, a touch-controller 102; unit control logic 104; a switch 106; an IR-PCAP touchscreen 108; a liquid crystal display (LCD) 110; an infrared (IR) touch sensor 112; an IR light emitting diode (LED) 114; an IR receiver 116; and an IR grid 118. These elements and features of the touchscreen device 100 may be operatively associated with one another, coupled to one another, or otherwise configured to cooperate with one another as needed to support the desired functionality, as described herein. For ease of illustration and clarity, all of the various physical, electrical, and logical couplings and interconnections for these elements and features may not be depicted in FIG. 1. Moreover, it should be appreciated that embodiments of the touchscreen device 100 will include other elements, modules, and features that cooperate to support the desired functionality. For simplicity, FIG. 1 only depicts certain elements that relate to the infrared projected capacitive (IR-PCAP) techniques described in more detail below.

The touchscreen device 100 includes a projected capacitive (PCAP) touchscreen 108 mounted in front of a liquid crystal display (LCD) 110. The PCAP touchscreen 108 is coupled to the infrared (IR) touch sensor 112, and the projected capacitive (PCAP) functionality is used in combination with the infrared (IR) touch capabilities. Thus, the touchscreen device 100 is an IR-PCAP touchscreen device. In some embodiments, the IR touch sensor 112 is mounted in a bezel of the LCD 110 and positioned in front of the LCD 110. The IR touch sensor 112 is implemented using the IR light emitting diode (LED) 114, the IR receiver 116, and IR reflectors (not shown). The IR LED 114 and the IR receiver 116 produce multiple close reflections between the IR reflectors to generate an IR grid 118 capable of sensing an object approaching the PCAP touchscreen 108. For example, a user finger or user stylus approaching the PCAP touchscreen 108 can obstruct the IR grid 118, indicating active use, or potential active use, of the touchscreen device 100 via the PCAP touchscreen 108.

The touch-controller 102 is a projected capacitive (PCAP) touch-controller and may be implemented using any standard microcontroller or other computer system on a chip (i.e., System on Chip (SoC)) that includes one or more processors or processor cores communicatively coupled to some form of system memory hardware, and programmable input/output (I/O) peripherals. The one or more processors may be implemented or performed with one or more general purpose processors, a content addressable memory, a digital signal processor, an application specific integrated circuit, a field programmable gate array, any suitable programmable logic hardware, discrete gate or transistor logic, discrete hardware components, or any combination designed to perform the functions described herein. The touch-controller 102 could include memory hardware integrated therein and/or memory hardware operatively coupled thereto, as appropriate to the particular embodiment. In practice, the memory hardware could be realized as RAM memory, flash memory, EPROM memory, EEPROM memory, registers, a hard disk, a removable disk, or any other form of storage medium known in the art.

The touch-controller 102 stores, maintains, and executes unit control logic 104 to determine a status of the touchscreen device 100, and to enable or disable use of a projected capacitive (PCAP) touchscreen 108 based on the detected status. During typical operation, the touch-controller 102 identifies an obstruction or a lack of obstruction to the IR grid 118.

When the IR grid 118 is unobstructed, or in other words, when no objects are positioned in such a way as to interfere with the reflections producing the IR grid 118, the touch-controller 102 identifies a "default" state of the touchscreen device 100. The default state indicates that the touchscreen device is not in active use. When the default state is identified by the touch-controller 102, the touch-controller 102 initiates adjustment and/or continued positioning of a switch 106 (e.g., a single-pole, double-throw (SPDT) switch) to ground. Connection of the conductive electrodes to ground enables formation of a shield capable of preventing electromagnetic interference (EMI) and radio frequency interference (RFI) during the default state of the touchscreen device 100. The PCAP touch screen 108 is implemented using an Indium Tin Oxide (ITO) based conductive grid in both x and y axis. In this proposed design, in a default state or a "no touch state", all of the electrodes are connected to ground (instead of floating electrodes in earlier case) by an SPDT switch mechanism (e.g., the switch 106), which provides shielding and/or a Faraday mesh to avoid EMI/RFI noise.

When the IR grid 118 is obstructed, the Unit control logic 104 identifies a "touch-state" of the touchscreen device 100. The touch-state indicates that the touchscreen device is in active use. During the touch-state, the Unit control logic 104 initiates adjustment of a switch 106 (e.g., a single-pole, double-throw (SPDT) switch) to connect conductive electrodes of the PCAP touchscreen 108 to the touch-controller 102. Connection of the conductive electrodes to the touch-controller 102 disables formation of the shield capable of preventing EMI and RFI during the touch-state, thus permitting user interaction with the PCAP touchscreen 108 during the touch-state of the touchscreen device 100. The PCAP touchscreen 108 is implemented using an ITO-based conductive grid. During a touch-state or an "active state", all of the electrodes are connected to a touch-controller interface by an SPDT switch mechanism (e.g., the switch 106), thus allowing the PCAP touchscreen controller 102 to sense the user touch position. Here, the time required to disable the shielding or Faraday mesh during user interaction is very small in comparison to regular operation of the touchscreen device 100, thus reducing the EMI/RFI noise.

Figure 2B:
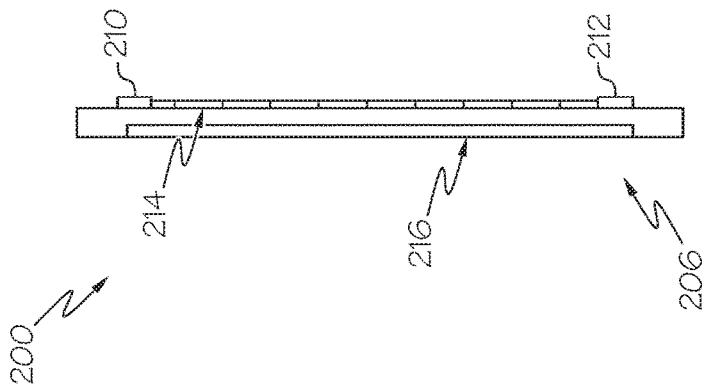
FIG. 2 is a diagram of various views of a touchscreen, in accordance with the disclosed embodiments.
Figure 2A:
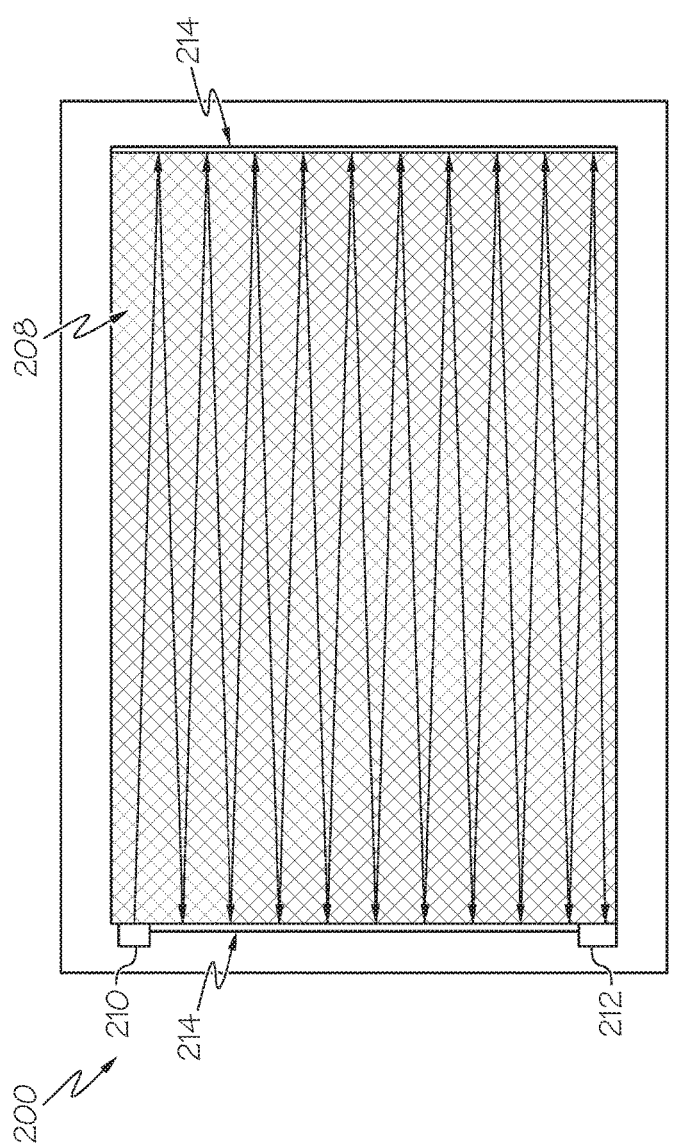
Figure 2C:
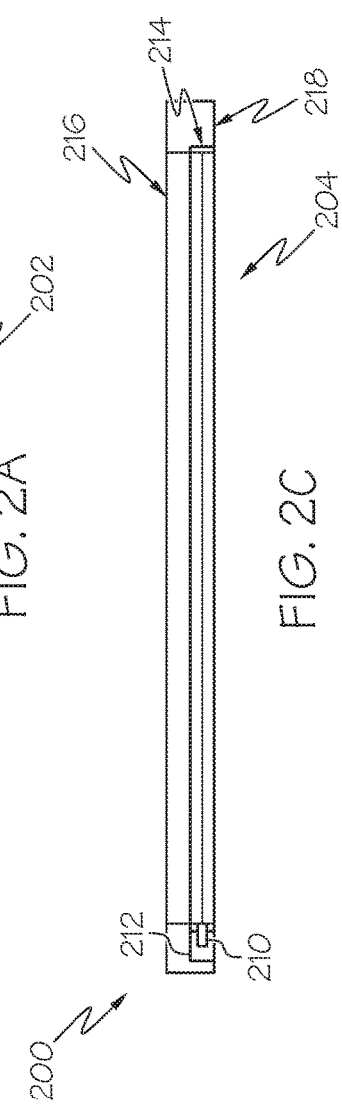

FIG. 2 is a diagram of various views of an infrared projected capacitive (IR-PCAP) touchscreen 200, in accordance with the disclosed embodiments. It should be noted that the IR-PCAP touchscreen 200 can be implemented with the touchscreen device 100 depicted in FIG. 1. In this regard, the IR-PCAP touchscreen 200 illustrates different perspectives of certain elements and components of the touchscreen device 100 in more detail. The various views of the IR-PCAP touchscreen 200 illustrated include a front view 202, a top view 204, and a side view 206 of a PCAP touchscreen 208, wherein the PCAP touchscreen 208 is mounted in front of a liquid crystal display (LCD) 216 and coupled to an IR touch sensor that includes an infrared (IR) light emitting diode (LED) 210, an IR receiver 212, and at least one IR reflector 214. As described previously with regard to FIG. 1, the IR reflectors 214 are positioned on opposite sides of the LCD bezel 218. The IR LED 210 and the IR receiver 212 are mounted and aligned on the LCD bezel 218 to produce required IR grid.

During operation, the IR LED 210 and the IR receiver 212 produce multiple close reflections between the IR reflectors 214 to generate an IR grid across a surface area of the PCAP touchscreen 208. In exemplary embodiments, the IR LED 210 and the IR receiver 212 are positioned on a first set of opposite sides of the LCD 216, and the IR reflectors 214 are positioned on a second set of opposite sides of the LCD 216, wherein the LCD 216 is square or rectangular in shape and includes two sets of opposite sides. The multiple close reflections are generated by the IR LED 210, received by the IR receiver 212, and reflected (by the IR reflectors 214) across a surface area of the LCD 216. The reflections across the surface area of the LCD 216 form the IR grid. The IR grid is capable of sensing an object approaching the PCAP touchscreen 208, which indicates active use, or potential active use, of the PCAP touchscreen 208.

Generally, infrared (IR) touchscreens use multiple IR transmitters and receivers which must be aligned for appropriate operation, and this configuration may require increased manufacturing costs and an expensive touchscreen. However, as described herein, the configuration of the IR-PCAP touchscreen includes a single IR transmitter (e.g., the IR LED 210), a single IR receiver 212, and a reflector mechanism (e.g., the IR reflectors 214). Multiple alignments are not required, thus reducing manufacturing cost and complexity.

Figure 3:
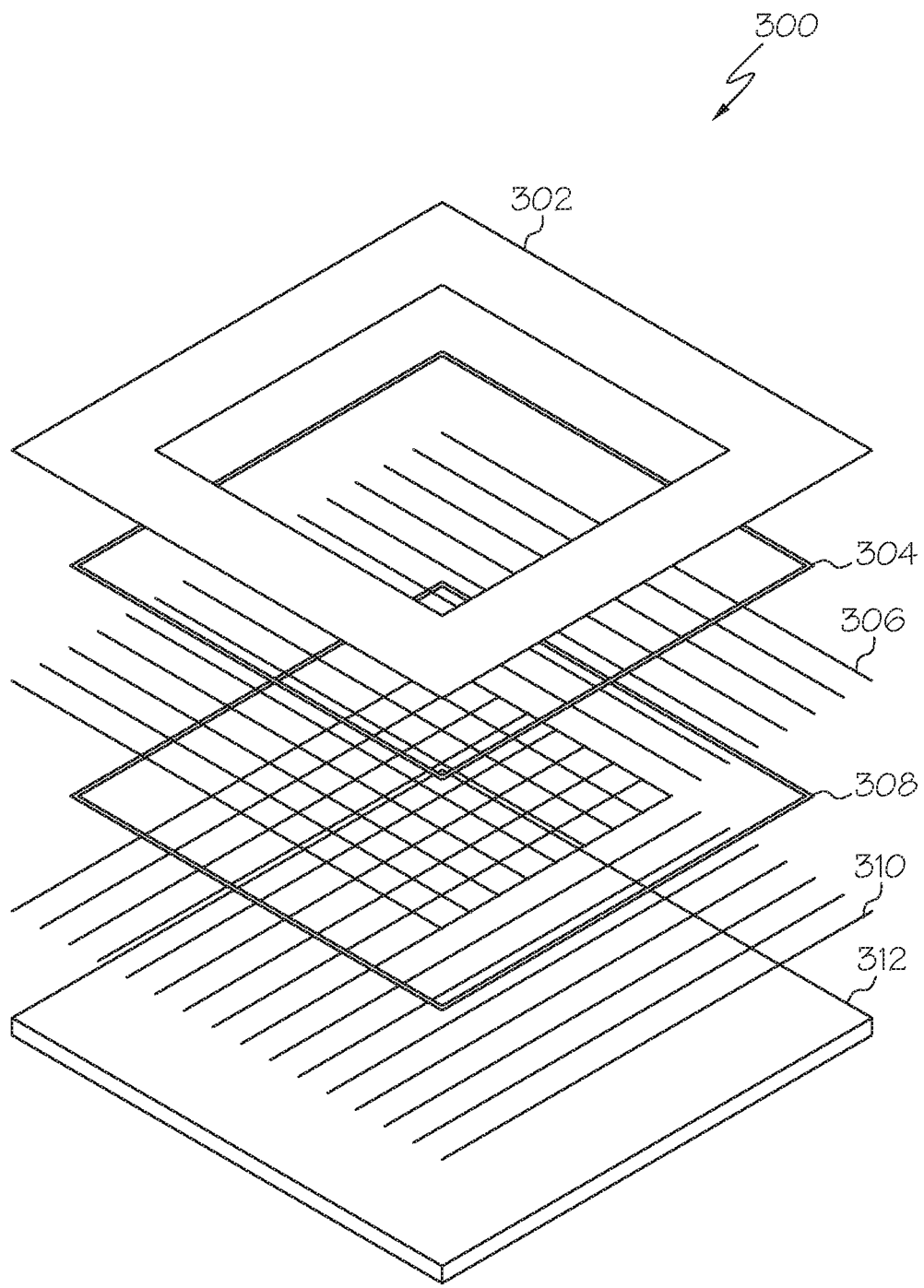
FIGS. 3-5 are diagrams of construction of a projected capacitive (PCAP) touchscreen, in accordance with the disclosed embodiments.
Figure 4:
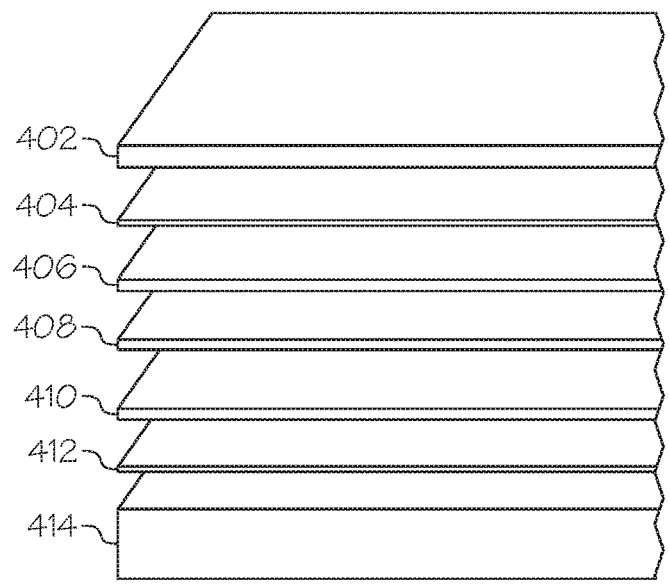
Figure 5:
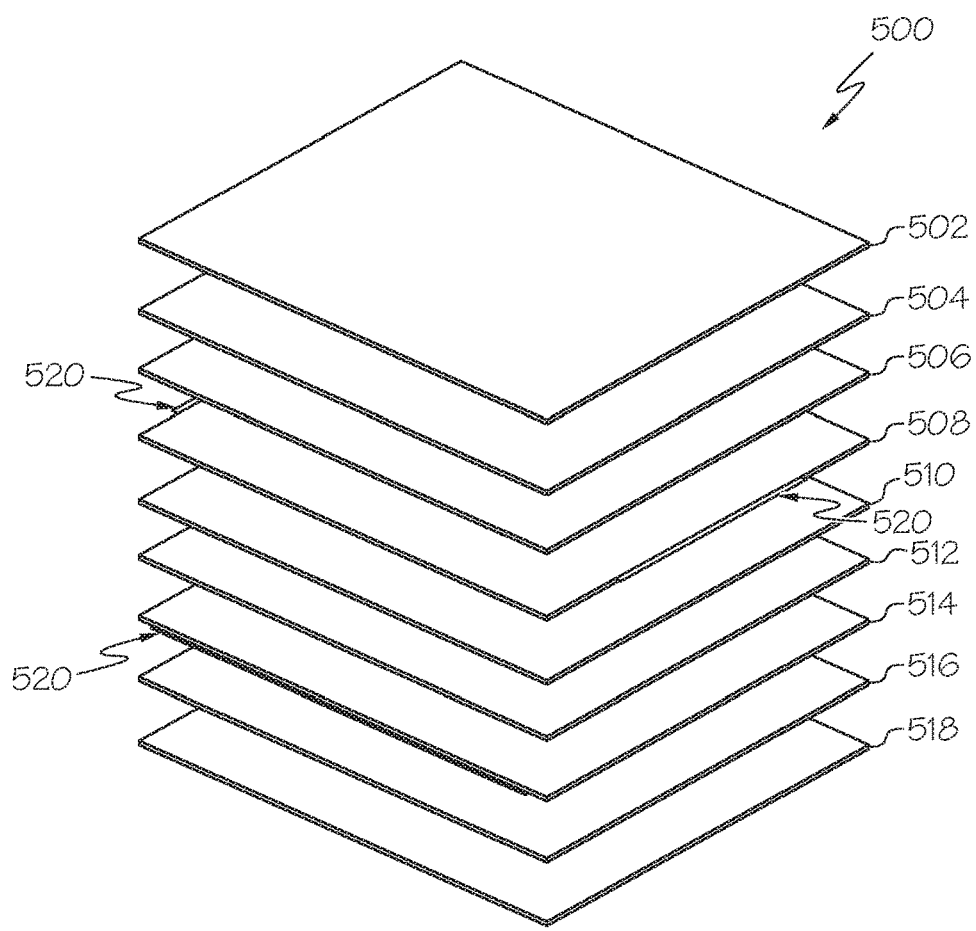

FIGS. 3-5 are diagrams of construction of a projected capacitive (PCAP) touchscreen, in accordance with the disclosed embodiments. As shown in FIGS. 3-5, the PCAP touchscreen sensor includes a large array of Indium Tin Oxide (ITO) conductors on one or more layers of glass or polyethylene terephthalate (PET) plastic. ITO conductors provide good optical clarity and low resistivity for the circuit described herein.

FIG. 3 is a diagram of one embodiment of the layers of materials included in a PCAP touchscreen 300. The first embodiment of a PCAP touchscreen 300 includes a dust cover glass lens 302 (top layer), an optical adhesive 304 (second layer), an Indium Tin Oxide (ITO) layer for the x-axis 306 (third layer), a second optical adhesive 308 (fourth layer), a second ITO layer for the y-axis 310 (fifth layer), and a liquid crystal display (LCD) 312 (sixth layer). Each illustrated layer is coupled to the previous layer above and the subsequent layer below. In this particular embodiment, the optical adhesive 304 functions to connect the dust cover glass lens 302 to the ITO layer for the x-axis 306, and the optical adhesive 308 functions to connect the ITO layer for the x-axis 306 to the ITO layer for the y-axis 310. The ITO layer for the y-axis 310 overlays the LCD 312, and may be fastened to the LCD 312 using another layer of optical adhesive (not shown).

FIG. 4 is a diagram of a second embodiment of layers of materials included in a PCAP touchscreen 400. The second embodiment of the PCAP touchscreen 400 includes a glass overlay 402 (top layer), an adhesive or isolation layer 404 (second layer), an Indium Tin Oxide (ITO) layer 406 (third layer), another glass layer 408 (fourth layer), another ITO layer 410, another adhesive or isolation layer 412 (fifth layer), and the liquid crystal display (LCD) 414 (sixth layer). Like the embodiment shown in FIG. 3, each illustrated layer of the PCAP touchscreen 400 is coupled to the previous layer above and the subsequent layer below. In this particular embodiment, the adhesive or isolation layer 404 functions to connect the glass overlay 402 to the ITO layer 406, and the adhesive or isolation layer 412 functions to connect the second ITO layer 410 to the LCD 414. This particular embodiment of the PCAP touchscreen 400 includes two layers of glass 402, 408, wherein each of the layers of glass 402, 408 overlay one of the ITO layers 406, 410. The glass layers 402, 408 are used for protection of the PCAP touchscreen 400 and, more particularly, for protection of each of the ITO layers 406, 410. Embodiments of the glass layers 402, 408 may also be implemented using a film layer or an acrylic layer (e.g., polymethylmethacrylate). In first glass layer 402, the conductive ITO electrodes are mounted in the X-axis, and in the second glass layer 408 the conductive ITO electrodes are mounted in the Y-axis. The two glass layers 402, 408 form the required X-Y mesh for PCAP touch screen for normal operation without compromising optical quality.

FIG. 5 is a diagram of a third embodiment of layers of materials included in a PCAP touchscreen 500. The third embodiment of the PCAP touchscreen 500 includes a glass overlay 502 (top layer); an optically clear adhesive 504

(second layer); rows printed on polyester 506, which includes a flexible printed circuit 520 (third layer); an Indium Tin Oxide (ITO) layer 508 (fourth layer); another layer of optically clear adhesive 510 (fifth layer); a layer of columns printed on polyester 512, which includes a flexible printed circuit 520 (sixth layer); another ITO layer 514 (seventh layer); another optically clear adhesive 516 (eighth layer); and another layer of polyester 518 (ninth layer). Like the embodiments shown in FIGS. 3-4, each illustrated layer of the PCAP touchscreen 500 is coupled to the previous layer above and the subsequent layer below.

Here, polyester (PET) film may be used for the PCAP touchscreen in one of three ways: (i) a conductive pattern printed on two separate sheets and then laminated together; (ii) a conductive pattern printed on both sides of a single sheet; or (iii) two conductive patterns printed on the same side with a dielectric layer in between with conductive bridges. Single layer construction reduces size of the device, due to a reduced number of layers, which is important in compact mobile displays. However, single layer construction requires a double pass (imaging) on the same layer. For a two-layer construction, only a single pass is required, but the lamination of two layers of PET requires precision alignment. On a single-sided, double-print solution, the bridging pattern can sometimes create optical anomalies that can be seen by the naked eye.

Glass solutions (as shown in FIGS. 3-4) can have similar constructions as that of PET. The embodiments shown in FIGS. 3-4 offer improved optics and rigidity. However, the glass layers of FIGS. 3-4 require a unique layer image mask for each sensor size or design, which can be a barrier to lower volume production and provides decreased flexibility in sensor customization and design due to the high cost of new layer masks. In addition, a PET construction (shown in FIG. 5) allows for a higher capacity, roll-to-roll manufacturing process which can reduce cost and increase flexibility, while glass-based solutions (shown in FIGS. 3-4) require individual glass sheets with a limited number of sensors per sheet.

The optical adhesives shown in FIGS. 3-5 may be implemented using silicone, epoxy, and polyurethane, or any other standard adhesive used to connect and fasten the layers of the PCAP touchscreen. The embodiments shown in FIGS. 3-5 use Indium Tin Oxide (ITO) construction. ITO sputtered onto a surface (e.g., glass or PET) achieves a sheet resistance typically in the 50-200Ω squared range. Sheet resistance and light transmission are directly proportional, or in other words, higher resistance equals higher light transmission as the ITO layer is typically thinner when trying to achieve greater light transmission. Index matching may be used to reduce pattern visibility when using lower resistance patterns. To create the pattern needed for the matrix or diamond design of the capacitance grid, laser etching, photolithography, and other methods can be used. In row and column ITO implementations, the conductive layers are insulated from one another. The embodiments shown in FIGS. 3-5 use Indium Tin Oxide (ITO) layers in place of conductive wires. However, other embodiments of the PCAP touchscreen may use conductive wires instead of ITO layers. Conductive wire construction provides a greater signal-to-noise ratio than ITO construction. However, the wired lines are typically visible to the naked eye. Wires can be designed into a grid array pattern and separated by a dielectric layer or specially designed for a single layer with a cover glass or PET over the electrodes.

Figure 6:
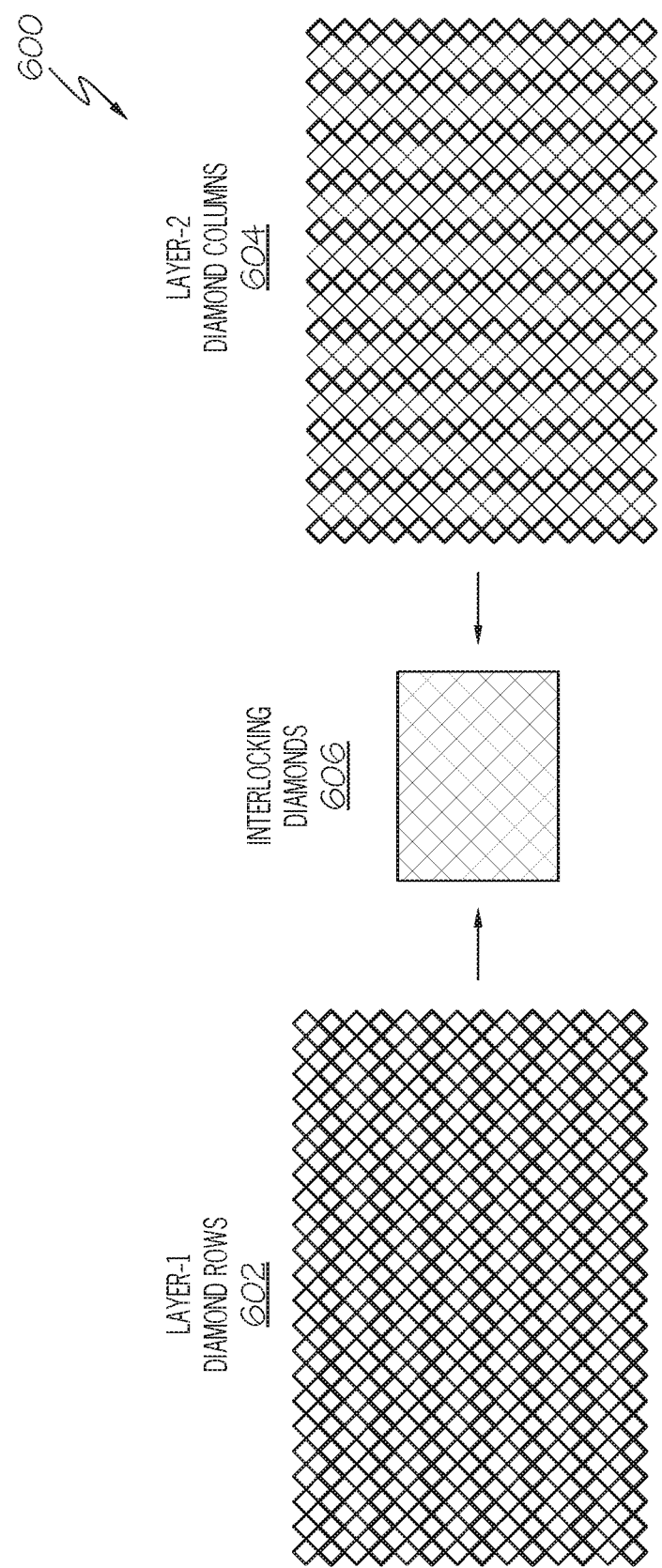
FIG. 6 is a diagram of projected capacitive (PCAP) touch sensors for use as part of a touchscreen, in accordance with the disclosed embodiments.

FIG. 6 is a diagram of projected capacitive (PCAP) touch sensors 600 for use as part of a touchscreen, in accordance with the disclosed embodiments. The touch sensors 600 may be implemented using layers, wherein each of the layers includes rows or columns of the touch sensors 600. It should be noted that the embodiments of layers including the touch sensors 600 may be implemented using the Indium Tin Oxide (ITO) layers described previously, with regard to FIGS. 3-5. In this regard, the touch sensors 600 of FIG. 6 show the ITO layers in more detail.

As shown, the touch sensors 600 include a first layer 602 of diamond-shaped rows and a second layer 604 of diamond-shaped columns. The first layer 602 and the second layer 604 are characterized by interlocking diamonds 606. Generally, matrix patterns and diamond patterns (e.g., interlocking diamonds 606) are commonly used for manufacturing of projected capacitive (PCAP) touch sensors. Diamond ITO patterns can be more uniformly printed than matrix patterns, which improves optics by reducing the impedance of the printed pattern, resulting in improved overall system performance Index-matched ITO patterns on glass or PET can offer improved optical characteristics. Even though ITO is a transparent conductive layer, with patterned ITO, the breaks in the pattern may be detected by the user due to changes in light refraction. In certain embodiments, sophisticated index matching is used to limit light refraction to reduce visibility of the pattern (e.g., to render the pattern nearly invisible). In addition, minimizing the air gap between the display and the PCAP touchscreen or optically bonding the PCAP touchscreen to the display are other ways to reduce light refraction, resulting in a better contrast and improved light transmission between the display and the end user.

Figure 7:
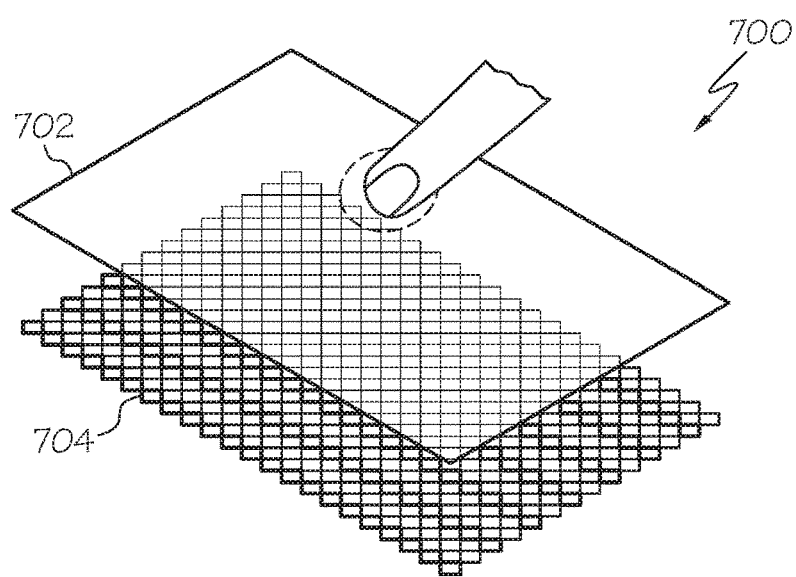
FIGS. 7-9 are diagrams of touchscreen surface layers, in accordance with the disclosed embodiments.
Figure 8:
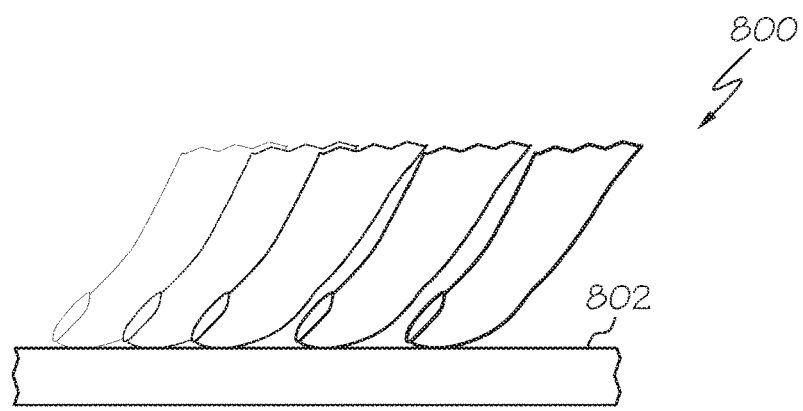
Figure 9:
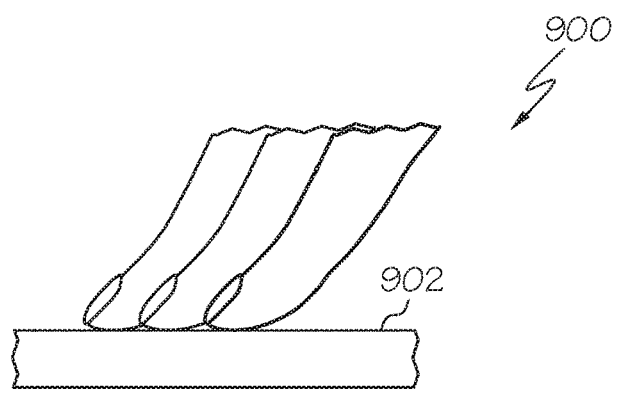

FIGS. 7-9 are diagrams of infrared projected capacitive (IR-PCAP) touchscreen surface layers, in accordance with the disclosed embodiments. FIG. 7 is diagram of an embodiment of a protective surface 702 for an IR-PCAP touchscreen 700, such as that described previously with regard to FIGS. 1-6. The protective surface 702 is a non-active, protective cover lens for the active surface 704 of the touch sensor. Projected capacitive (PCAP) touch technology typically projects the signal outward for creating an electrical field, and does not require direct contact with the active surface 704. Thus, the protective surface 702 may overlay the active surface 704 of the touch sensor without hindering use of the touch sensor.

The protective surface 702 may be implemented using a glass substrate or other transparent, protective layer used as the surface of the touch sensor. The glass surface can be a standard glass, tempered glass, or chemically-strengthened glass depending on the application needs. This "second surface" technology means that screen cracks, scratches or surface wear would have to extend through the entire thickness of the cover glass to reach the electrodes and cause functional damage. Thickness of cover glass can affect system performance and accuracy. Additionally, the IR-PCAP touchscreen implements anti-glare characteristics to optimize screen-viewing in ambient light environments. The reflections on the IR-PCAP touchscreen 700 can be significantly reduced by implementing the protective surface 702 using an anti-glare cover glass. In some embodiments, the protective surface 702 is modified using a chemical etch process which creates surface anomalies that refract light, dispersing the light reflection so the user can still see the image on the screen. In other embodiments, a coating is applied to the protective surface 702 (e.g., sensor cover glass or to a PET film overlay).

FIG. 8 is a diagram of an embodiment of an IR-PCAP touchscreen 800 that includes a surface 802 without anti-stiction capabilities, and FIG. 9 is a diagram of an embodiment of an IR-PCAP touchscreen 900 that includes an anti-stiction surface 902. FIG. 8 illustrates a decreased speed of motion for a user finger, stylus, or other object that is moving along the surface of the IR-PCAP touchscreen 800, due to stiction of the surface of the IR-PCAP touchscreen 800. Stiction may prevent user interaction with the IR-PCAP touchscreen as motion of the contacting object is hindered. Exemplary embodiments of the present disclosure include an anti-stiction surface 902, as shown in FIG. 9. As shown, the anti-stiction surface 902 reduces the amount of friction that the contact object encounters during interaction of the user with the IR-PCAP touchscreen 900, resulting in a gliding motion for the contact object.

Figure 10:
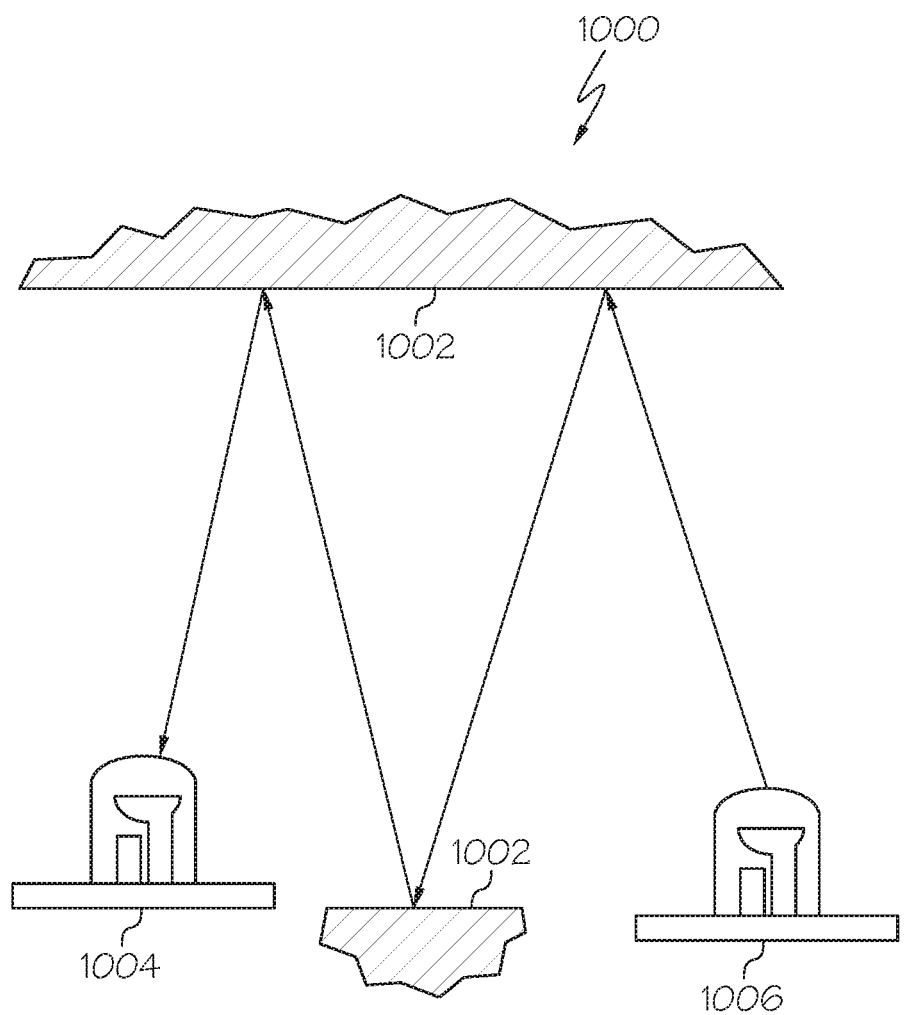
FIG. 10 is a diagram of infrared (IR) technology used as part of a touchscreen, in accordance with the disclosed embodiments.

FIG. 10 is a diagram of infrared (IR) sensor technology used as part of an infrared projected capacitive (IR-PCAP) touchscreen 1000, in accordance with the disclosed embodiments. The IR-PCAP touchscreen 1000 is one exemplary embodiment of an IR-PCAP touchscreen shown in FIGS. 1-2. As shown, the IR-PCAP touchscreen 1000 includes an IR sensor and reflective surfaces 1002. The IR sensor is a device that includes: (1) an IR light emitting diode (LED) 1006 that emits IR radiation, and (2) a photodiode 1004 that detects the IR radiation. In this embodiment, the photodiode 1004 functions as the IR receiver described previously with regard to FIGS. 1-2. The reflective surfaces 1002 may be implemented using any reflective material suitable for use with the photodiode 1004. Exemplary embodiments may include, without limitation: gold, gold-leaf sheets, gold-coating (e.g., a gold-coated metal alloy), aluminum, and transparent acrylic plastic (e.g., Plexiglas). As described herein, the IR grid is generated when the IR signal transmitted by the IR LED 1006 is reflected by the reflective surfaces 1002, and is received by the photodiode 1004. Obstructions to the IR grid are detected when a contact object (e.g., user finger or stylus) blocks the IR signal emitted by the IR LED 1006 such that it is not received by the photodiode 1004, indicating a touch-state of the IR-PCAP touchscreen 1000.

Figure 11:
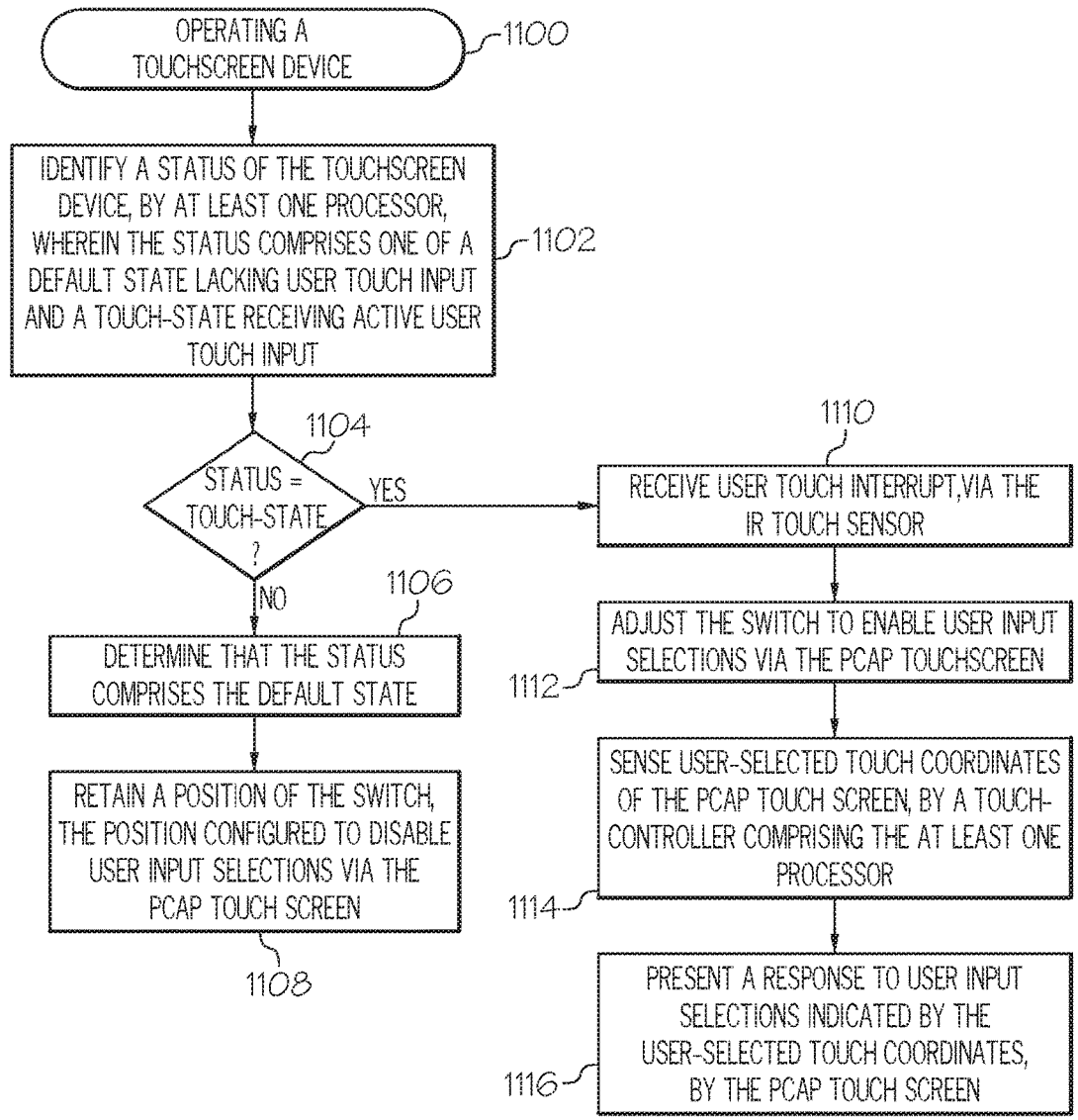
FIG. 11 is a flow chart that illustrates an embodiment of a process for operating a touchscreen device, in accordance with the disclosed embodiments.

FIG. 11 is a flow chart that illustrates an embodiment of a process 1100 for operating a touchscreen device, in accordance with the disclosed embodiments. First, the process 1100 identifies a status of the touchscreen device, by at least one processor (step 1102). One suitable methodology for identifying a status of the touchscreen device is described below with reference to FIG. 12. In this scenario, the touchscreen device comprises at least a projected capacitive (PCAP) touchscreen mounted in front of a liquid crystal display (LCD), an infrared (IR) touch sensor configured to generate an IR grid, a switch, and the at least one processor. The status is either: (1) a default state lacking user touch input, or (2) a touch-state receiving active user touch input.

The touch-state occurs when a user is actively interacting with the PCAP touchscreen and/or when the touchscreen device detects potential user interaction and prepares for the potential user interaction by enabling user input to the PCAP touchscreen. The default state is characterized by a lack of user interaction, or detected potential user interaction, with the touchscreen device. Here, by identifying status of the touchscreen, the process 1100 determines whether the touchscreen is being actively operated by a user, or the touchscreen is currently unused (i.e., inactive).

When the status of the touchscreen is not the touch-state (the "No" branch of 1104), the process 1104 determines that the status is the default state (step 1106) and retains a position of the switch configured to disable user input selections via the PCAP touchscreen (step 1108). When the status of the touchscreen is the touch-state (the "Yes" branch of 1104), the process 1104 is configured to receive a user touch interrupt, via the IR touch sensor (step 1110) and adjusts the switch to enable user input selections via the PCAP touchscreen (step 1112). One suitable methodology for enabling user input selections is described below with reference to FIG. 14. Here, because the process 1100 has determined that the status of the touchscreen is the touch-state, the PCAP touchscreen is currently in active use or, in certain embodiments, the PCAP touchscreen is potentially in active use. Current active use indicates that the PCAP touchscreen is currently receiving user input selections via the PCAP touchscreen. Potential current active use occurs when the touchscreen device detects approaching user input. When currently or potentially in active use, the touchscreen device is altered to permit user input via the PCAP touchscreen.

After enabling the user input selections via the PCAP touchscreen (step 1112), the touchscreen is operational for user interaction. In some embodiments, the process 1100 senses user-selected touch coordinates of the PCAP touchscreen, by a touch-controller comprising the at least one processor (step 1114). User-selected touch coordinates reference an x-axis position and a y-axis position of the PCAP touchscreen, which is the contact location of user touch. Each contact location of user touch may indicate one or more user input selections. After sensing the user-selected touch coordinates, and thus receiving one or more associated user input selections, the process 1000 presents a response to the user input selections, by the PCAP touchscreen (step 1116). User input selections may include any user interaction with graphical elements presented by the PCAP touchscreen, and the response to the user input selections may include a presentation of text, graphical elements, or other audio/visual feedback associated with one or more applications with which a user is interacting, via the PCAP touchscreen.

Figure 12:
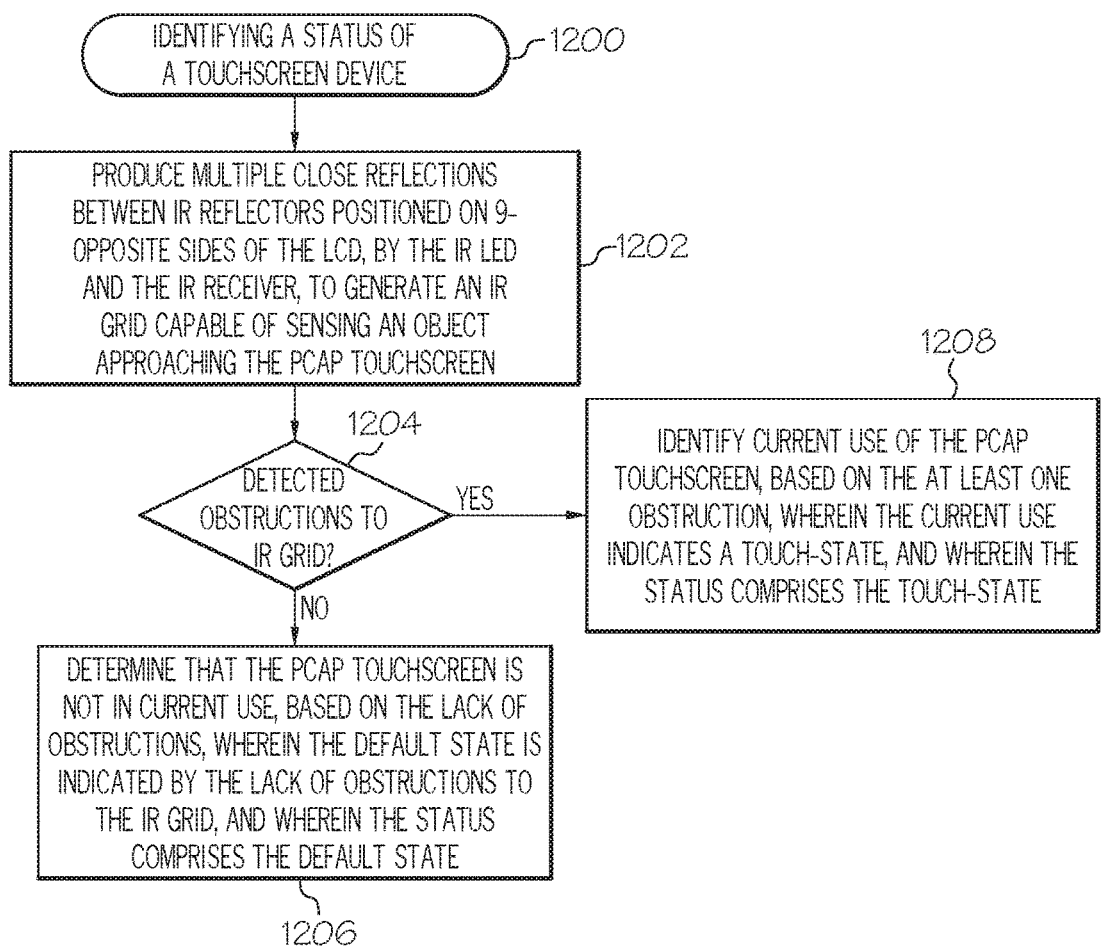
FIG. 12 is a flow chart that illustrates an embodiment of a process for identifying a status of a touchscreen device, in accordance with the disclosed embodiments.

FIG. 12 is a flow chart that illustrates an embodiment of a process 1200 for identifying a status of a touchscreen device, in accordance with the disclosed embodiments. It should be appreciated that the process 1200 described in FIG. 12 represents one embodiment of step 1102 described above in the discussion of FIG. 11, including additional detail. The process 1200 produces multiple close reflections between infrared (IR) reflectors positioned on opposite sides of a liquid crystal display (LCD), by an IR light emitting diode (LED) and an IR receiver, to generate an IR grid capable of sensing an object approaching the projected capacitive (PCAP) touchscreen (step 1202). In exemplary embodiments, the IR LED and the IR receiver are positioned on a first set of opposite sides of the LCD, and the IR reflectors are positioned on a second set of opposite sides of the LCD, wherein the LCD is square or rectangular in any shapes and includes two sets of opposite sides. The multiple close reflections are generated by the IR LED, received by the IR receiver, and reflected (by the IR reflectors) across a surface area of the LCD. The reflections across the surface area of the LCD form the IR grid. The IR grid is capable of sensing an object approaching the PCAP touchscreen, which indicates active use, or potential active use, of the PCAP touchscreen.

The process 1200 determines whether obstructions to the IR grid have been detected, using the IR grid (decision 1204). A user generally moves an object, such as a stylus or user finger, toward the PCAP touchscreen to interact with the PCAP touchscreen. For example, the user may make selections, enter data, and otherwise provide user input to the PCAP touchscreen using the object. As the object approaches the PCAP touchscreen, the object may block the IR receiver from receiving the IR signal generated by the IR LED. By blocking the IR signal, the object becomes an obstruction that collapses the IR grid.

When obstructions to the IR grid have not been detected (the "No" branch of 1204), the process 1200 determines that the PCAP touchscreen is not in current use, based on the lack of obstructions, wherein the default state is indicated by the lack of obstructions to the IR grid, and wherein the status comprises the default state (step 1208). When obstructions to the IR grid have been detected (the "Yes" branch of 1204), the process 1200 identifies current use of the PCAP touchscreen, based on the at least one obstruction, wherein the current use indicates a touch-state, and wherein the status comprises the touch-state (step 1208).

Obstructions to the IR grid are interpreted by the process 1200 as a user interacting, or attempting to interact, with the PCAP touchscreen. User interactions with the PCAP touchscreen, characterized by obstructions to the IR grid, occur during a touch-state of the PCAP touchscreen. In certain embodiments, user interactions may initiate a change to the touch-state from the default state. In this case, the obstruction to the IR grid indicates potential user interaction with the PCAP touchscreen, and the change from the default state to the touch-state permits actual user interaction with the PCAP touchscreen. A lack of obstructions to the IR grid are interpreted by the process 1200 as dormancy, inactivity, or a general lack of use of the PCAP touchscreen. The lack of use of the PCAP touchscreen indicates a default state of the PCAP touchscreen.

Figure 13:
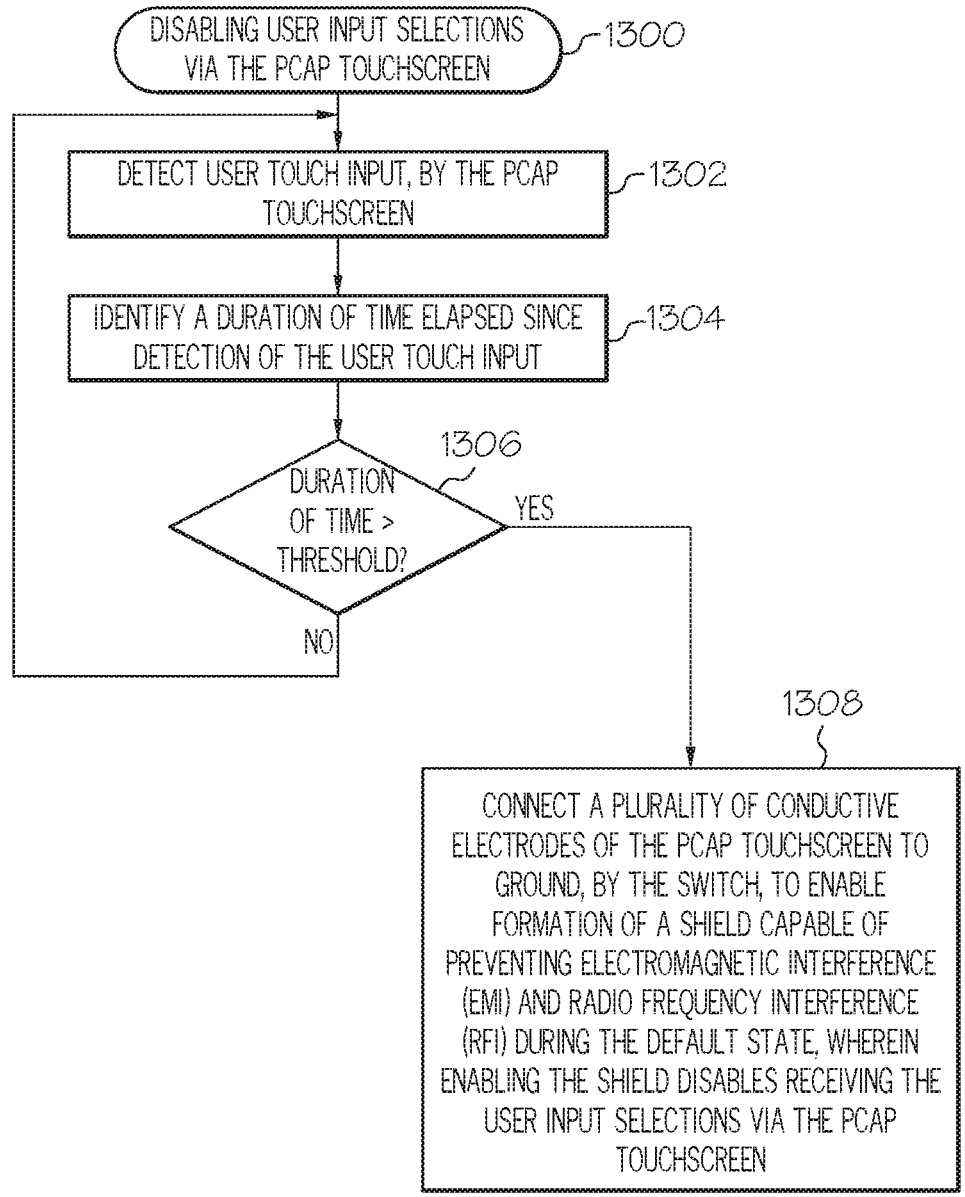
FIG. 13 is a flow chart that illustrates an embodiment of a process for disabling user input selections via a projected capacitive (PCAP) touchscreen, in accordance with the disclosed embodiments.

FIG. 13 is a flow chart that illustrates an embodiment of a process 1300 for disabling user input selections via a projected capacitive (PCAP) touchscreen, to create a default state of the PCAP touchscreen, in accordance with the disclosed embodiments.

The process 1300 detects user touch input, by the PCAP touchscreen (step 1302). User touch input is detected by a an IR grid, as described previously with regard to FIG. 1. The process 1300 then identifies a duration of time elapsed since detection of the user touch input (step 1304). When the duration of time is not greater than a threshold (the "No" branch of 1306), the process 1300 determines that a sleep mode or inactive mode of the PCAP touchscreen is not indicated, and continues monitoring the time duration that follows user touch input to the PCAP touchscreen.

However, when the duration of time is greater than a threshold (the "Yes" branch of 1306), then the process 1300 connects a plurality of conductive electrodes of the PCAP touchscreen to ground, by the switch, to enable formation of a shield capable of preventing electromagnetic interference (EMI) and radio frequency interference (RFI) during the default state (step 1308). The plurality of conductive electrodes are connected to ground by a switch. The switch functions to either (1) connect the plurality of conductive electrodes to a PCAP touch-controller, permitting user input via the IR-PCAP touchscreen; or (2) connect the plurality of conductive electrodes to ground, creating the EMI/RFI shield and disabling receiving user input selections via the PCAP touchscreen. In this scenario, the default state is active, the switch is adjusted to connect the conductive electrodes to ground, and the EMI/RFI shield is enabled.

Connecting the conductive electrodes to ground (step 1308) also disables an IR grid of the IR-PCAP touchscreen. The IR grid is generated by the IR light emitting diode (LED), as described previously with respect to FIGS. 1, 2, and 10. The process 1300 may disable the IR grid by deactivating the IR LED when user touch input has not been received by the PCAP touchscreen for a duration of time longer than a predetermined threshold. During normal operation, the IR grid is always active, and is deactivated in cases when user touch input has not been detected for a lengthy duration of time (e.g., sleep mode of the IR-PCAP touchscreen), thus allowing the system to save the power and life of the IR LED. The IR grid is activated first in sequence, for any momentary trigger of touch interrupt.

Figure 14:
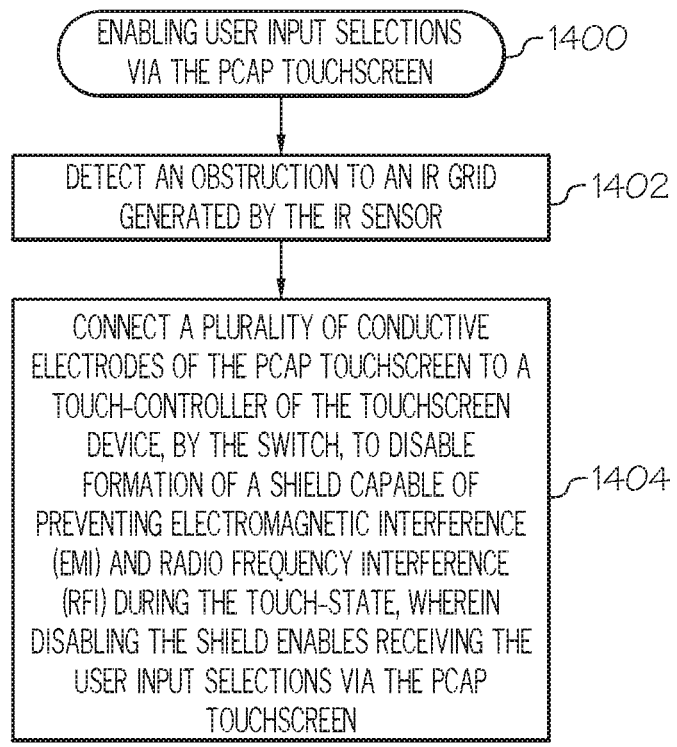
FIG. 14 is a flow chart that illustrates an embodiment of a process for enabling user input selections for a projected capacitive (PCAP) touchscreen, in accordance with the disclosed embodiments.

FIG. 14 is a flow chart that illustrates an embodiment of a process 1400 for enabling user input selections for a projected capacitive (PCAP) touchscreen, in accordance with the disclosed embodiments. It should be appreciated that the process 1400 described in FIG. 14 represents one embodiment of step 1112 described above in the discussion of FIG. 11, including additional detail.

The process 1400 detects an obstruction to an IR grid generated by the IR sensor (step 1402). The IR grid is generated by the IR light emitting diode (LED), as described previously with respect to FIGS. 1, 2, and 10. When the obstruction to the IR grid is detected (step 402), the process 1400 connects a plurality of electrodes of the PCAP touchscreen to a touch-controller of the touchscreen device, by the switch, to disable formation of a shield capable of preventing electromagnetic interference (EMI) and radio frequency interference (RFI) during the touch-state (step 1404). The plurality of conductive electrodes are connected to ground by a switch. The switch functions to either (1) connect the plurality of conductive electrodes to a touch-controller, disabling the EMI/RFI shield and permitting user input via the IR-PCAP touchscreen; or (2) connect the plurality of conductive electrodes to ground, creating the EMI/RFI shield and disabling receiving user input selections via the PCAP touchscreen. In this scenario, the touch-state is active, the switch is adjusted to connect the conductive electrodes to the touch-controller, and the EMI/RFI shield is disabled.

The various tasks performed in connection with processes 1100-1400 may be performed by software, hardware, firmware, or any combination thereof. For illustrative purposes, the preceding descriptions of processes 1100-1400 may refer to elements mentioned above in connection with FIGS. 1-10. In practice, portions of processes 1100-1400 may be performed by different elements of the described system. It should be appreciated that processes 1100-1400 may include any number of additional or alternative tasks, the tasks shown in FIGS. 11-14 need not be performed in the illustrated order, and processes 1100-1400 may be incorporated into a more comprehensive procedure or process having additional functionality not described in detail herein. Moreover, one or more of the tasks shown in FIGS. 11-14 could be omitted from embodiments of the processes 1100-1400 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for operating a touchscreen device, the method comprising:
    identifying a status of the touchscreen device, by at least one processor, wherein the touchscreen device comprises at least a projected capacitive (PCAP) touchscreen mounted in front of a liquid crystal display (LCD) of the touchscreen device, an infrared (IR) touch sensor configured to generate an IR grid, a switch, and the at least one processor, and wherein the status comprises one of a default state lacking user touch input and a touch-state receiving active user touch input;
    when the status comprises the touch-state, adjusting the switch to enable user input selections via the PCAP touchscreen; and
    when the status comprises the default state, retaining a position of the switch, the position configured to disable user input selections via the PCAP touchscreen.

2. The method of claim 1, wherein the method further comprises:
 disabling user input selections via the projected capacitive (PCAP) touchscreen, to create the default state of the PCAP touchscreen, by:
  detecting user touch input, via the PCAP touchscreen;
  identifying a duration of time elapsed since detection of the user touch input; and
  when the duration of time is greater than a threshold, connecting a plurality of conductive electrodes of the PCAP touchscreen to ground, by the switch, to enable formation of a shield capable of preventing electromagnetic interference (EMI) and radio frequency interference (RFI) during the default state;
  wherein enabling the shield disables receiving the user input selections via the PCAP touchscreen to create the default state.

3. The method of claim 1, wherein enabling user input selections further comprises:
 detecting an obstruction to the IR grid generated by the IR touch sensor; and
 in response to detecting the obstruction, connecting a plurality of conductive electrodes of the PCAP touchscreen to the touch-controller of the touchscreen device, by the switch, to disable formation of a shield capable of preventing electromagnetic interference (EMI) and radio frequency interference (RFI) during the touch-state, wherein the touch-controller comprises the at least one processor;
 wherein disabling the shield enables receiving the user input selections via the PCAP touchscreen.

4. The method of claim 1, further comprising:
 sensing user-selected touch coordinates of the PCAP touchscreen, by a touch-controller of the touchscreen device, wherein the touch-controller comprises the at least one processor;
 receiving user input selections indicated by the user-selected touch coordinates, via the IR touch sensor; and
 presenting a response to the user input selections, by the PCAP touchscreen.

5. The method of claim 1, wherein identifying the status of the touchscreen device further comprises:
 detecting at least one obstruction to the IR grid; and
 identifying current use of the PCAP touchscreen, based on the at least one obstruction, wherein the current use indicates the touch-state, and wherein the status comprises the touch-state.

6. The method of claim 5, wherein the IR touch sensor is mounted in a bezel of the LCD and positioned in front of the LCD, wherein the IR touch sensor further comprises an infrared (IR) receiver, an infrared (IR) light emitting diode (LED), and infrared (IR) reflectors positioned on opposite sides of the LCD, and wherein the IR LED and the IR receiver are aligned in the bezel;
 wherein the method further comprises producing multiple close reflections between the IR reflectors, by the IR LED and the IR receiver, to generate the IR grid capable of sensing an object approaching the PCAP touchscreen during touch operation; and
 wherein the at least one obstruction comprises the object approaching the PCAP touchscreen.

7. The method of claim 1, wherein identifying the status of the touchscreen device further comprises:
 detecting a lack of obstructions to the IR grid; and
 determining that the PCAP touchscreen is not in current use, based on the lack of obstructions, wherein the default state is indicated by the lack of obstructions to the IR grid, and wherein the status comprises the default state.

8. A touchscreen device, comprising:
 a projected capacitive touch (PCAP) touchscreen mounted in front of a liquid crystal display (LCD);
 a switch coupled to the PCAP touchscreen, the switch configured to shift between a first position connecting the PCAP touchscreen to ground and a second position connecting the PCAP touchscreen to a touch-controller;
 an infrared (IR) touch sensor configured to generate an IR grid; and
 the touch-controller comprising at least a system memory element and a processor, the touch-controller communicatively coupled to the PCAP touchscreen, the switch, and the IR sensor, and the touch-controller configured to:
  identify a status of the touchscreen device, wherein the status comprises one of a default state lacking user touch input and a touch-state receiving active user touch input;
  when the status comprises the touch-state, adjust the switch to enable user input selections via the PCAP touchscreen, based on adjusting the switch; and
  when the status comprises the default state, retain a position of the switch, the position configured to disable user input selections via the PCAP touchscreen.

9. The touchscreen device of claim 8, wherein the touch-controller is configured to:
 disable user input selections via the projected capacitive (PCAP) touchscreen, to create the default state of the PCAP touchscreen, by:
  detecting user touch input, via the PCAP touchscreen;
  identifying a duration of time elapsed since detection of the user touch input; and
   when the duration of time is greater than a threshold, connecting a plurality of conductive electrodes of the PCAP touchscreen to ground, by the switch, to enable formation of a shield capable of preventing electromagnetic interference (EMI) and radio frequency interference (RFI) during the default state;
  wherein enabling the shield disables receiving the user input selections via the PCAP touchscreen to create the default state.

10. The touchscreen device of claim 9, wherein the PCAP touchscreen comprises one or more layers of glass; and
 wherein the plurality of conductive electrodes comprises an array of indium tin oxide (ITO) conductors positioned on the one or more layers of glass.

11. The touchscreen device of claim 9, wherein the PCAP touchscreen comprises one or more layers of polyethylene terephthalate (PET) plastic; and
 wherein the plurality of conductive electrodes comprises an array of indium tin oxide (ITO) conductors positioned on the one or more layers of PET plastic.

12. The touchscreen device of claim 8, wherein the touch-controller is configured to enable user input selections by:
 detecting an obstruction to the IR grid generated by the IR touch sensor; and
 in response to detecting the obstruction, connecting a plurality of conductive electrodes of the PCAP touchscreen to the touch-controller of the touchscreen device, by the switch, to disable formation of a shield capable of preventing electromagnetic interference (EMI) and radio frequency interference (RFI) during the touch-state, wherein the touch-controller comprises the at least one processor;

wherein disabling the shield enables receiving the user input selections via the PCAP touchscreen.

13. The touchscreen device of claim 8, wherein the touch-controller is further configured to:

sense user-selected touch coordinates of the PCAP touchscreen, by a touch-controller of the touchscreen device, wherein the touch-controller comprises the at least one processor;

receive user input selections indicated by the user-selected touch coordinates, via the IR touch sensor; and present a response to the user input selections, via the PCAP touchscreen.

14. The touchscreen device of claim 8, wherein the touch-controller is configured to identify the status of the touchscreen device by:

detecting at least one obstruction to the IR grid; and identifying current use of the PCAP touchscreen, based on the at least one obstruction, wherein the current use indicates the touch-state, and wherein the status comprises the touch-state.

15. The touchscreen device of claim 14, wherein the IR touch sensor is mounted in a bezel of the LCD and positioned in front of the LCD, and wherein the IR touch sensor further comprises:

an infrared (IR) receiver;

an infrared (IR) light emitting diode (LED); and infrared (IR) reflectors positioned on opposite sides of the LCD, wherein the IR LED and the IR receiver are aligned in the bezel to produce multiple close reflections between the IR reflectors to generate the IR grid capable of sensing an object approaching the PCAP touchscreen during touch operation, and wherein the at least one obstruction comprises the object approaching the PCAP touchscreen.

16. The touchscreen device of claim 15, wherein the IR reflectors comprise IR reflective surface materials that include at least one of gold metal, gold-coated metal alloy, and gold-leaf sheets.

17. The touchscreen device of claim 15, wherein the IR reflectors comprise at least an aluminum IR reflective surface material.

18. The touchscreen device of claim 15, wherein the IR reflectors comprise at least a transparent acrylic plastic IR reflective surface material.

19. The touchscreen device of claim 8, wherein the touch-controller is configured to identify the status of the touchscreen device by:

detecting a lack of obstructions to the IR grid; and determining that the PCAP touchscreen is not in current use, based on the lack of obstructions, wherein the default state is indicated by the lack of obstructions to the IR grid, and wherein the status comprises the default state.

20. A touchscreen system, comprising:

a projected capacitive touch (PCAP) touchscreen mounted in front of a liquid crystal display (LCD);

a switch coupled to the PCAP touchscreen, the switch configured to shift between a first position connecting the PCAP touchscreen to ground and a second position connecting the PCAP touchscreen to a touch-controller;

an infrared (IR) touch sensor mounted in a bezel of the LCD and positioned in front of the LCD, wherein the IR touch sensor further comprises an infrared (IR) receiver, an infrared (IR) light emitting diode (LED), and infrared (IR) reflectors positioned on opposite sides of the LCD, wherein the IR LED and the IR receiver are aligned in the bezel to produce multiple close reflections between the IR reflectors to generate an IR grid capable of sensing an object approaching the PCAP touchscreen during touch operation; and the touch-controller comprising at least a system memory element and a processor, the touch-controller communicatively coupled to the PCAP touchscreen, the switch, and the IR sensor, and the touch-controller configured to:

identify a status of the touchscreen device, wherein the status comprises one of a default state lacking user touch input and a touch-state receiving active user touch input;

when the status comprises the touch-state, adjust the switch to enable user input selections via the PCAP touchscreen, based on adjusting the switch; and when the status comprises the default state, retain a position of the switch, the position configured to disable user input selections via the PCAP touchscreen.

* * * * *